United States Patent [19]

Beyers, Jr.

[11] Patent Number: 4,581,645

[45] Date of Patent: Apr. 8, 1986

[54] DISTRIBUTED SWITCHED COMPONENT AUDIO/VIDEO SYSTEM

[75] Inventor: Billy W. Beyers, Jr., Greenfield, Ind.

[73] Assignee: RCA Corporation, Princeton, N.J.

[21] Appl. No.: 508,605

[22] Filed: Jun. 28, 1983

[51] Int. Cl.[4] .......................................... H04N 5/268
[52] U.S. Cl. .................................................. 358/181
[58] Field of Search ...................... 358/181, 194.1, 86, 358/93, 185, 310, 335; 455/3, 133, 140

[56] References Cited

U.S. PATENT DOCUMENTS

| | | | |
|---|---|---|---|
| 4,276,562 | 6/1981 | Stewart | 358/181 |
| 4,334,242 | 6/1982 | Mangold | 358/127 |
| 4,337,480 | 6/1982 | Bourassin et al. | 358/93 |
| 4,338,632 | 7/1982 | Falater | 358/194 |
| 4,400,735 | 8/1983 | Strammello, Jr. | 358/181 |
| 4,456,928 | 6/1984 | Guillon et al. | 358/181 |
| 4,495,497 | 1/1985 | Molnar | 340/825.63 |
| 4,502,026 | 2/1985 | Imazeki | 358/181 |

FOREIGN PATENT DOCUMENTS 53-121601 10/1978 Japan .
2072407A 9/1981 United Kingdom .

OTHER PUBLICATIONS

Radio Shack, Video Selector, Cat. No. 15-1261, 1983 Catalog.
Page 13 of the RCA Selectavision Video Disc Player SGT 250 Owner's Manual, published by RCA Corporation in 1982.
RCA Service Data for Selectavision Video Disc Player Model SGT 250, published by RCA Corporation in 1982 (p. 51).
RCA Service Data for Video Cassette Recorder Model TDP 1000, published by RCA Corporation in 1980 (pp. 7-49 and 7-54).
Article entitled "Component Television" by Telka S. Perry, published in IEEE Spectrum Jun. 1983, pp. 38 to 43.
Instructions for TS—2B Video Audio Switcher, IB31181, published 1965 by RCA Corporation, Camden, NJ.

Primary Examiner—Tommy P. Chin
Attorney, Agent, or Firm—Eugene M. Whitacre; Peter M. Emanuel; Lawrence C. Edelman

[57] ABSTRACT

An interconnection system for an audio and video component entertainment system includes a single conductor audio bus serially coupled between each of the video and audio components transfers audio signal in a "daisy-chain" manner among the components. The video components are grouped together separately from the audio components along the audio bus and both types of components supply and/or receive audio signals from the bus. A first switch in series with the audio bus separates the audio bus into first and second sections so as to allow simultaneous and independent audio signal transfer among the video and audio components connected to the separated sections of the audio bus. A single conductor video bus serially coupled between each of the video components transfers video signal in a "daisy-chain" manner among the video components. A second switch in series with the video bus separates the video bus into first and second sections so as to allow simultaneous and independent video signal transfer among video components connected to the separated sections of the video bus.

10 Claims, 5 Drawing Figures

DISTRIBUTED SWITCHED COMPONENT AUDIO/VIDEO SYSTEM

FIELD OF THE INVENTION

The present invention relates to an audio and/or video component interconnection system and more particularly to a signal bus connection arrangement for selectively distributing video and/or audio signals among the various audio and video components of the system.

BACKGROUND OF THE INVENTION

Video and audio components allow users to create their own entertainment systems and to modify them as they desire.

One method for interconnection of these various components is to connect cables by hand between those components which are presently to be used and to manually change the cable connections when it is desired to use other components. This method is obviously unsatisfactory due to the manual re-arranging of cables required each time it is desired to operate the system in a different manner.

Another approach is to couple each component to a plurality of switches, which may be centrally located or distributed. The switches can be manually or remotely controlled to route the various signals between specific ones of the components to enable the system to operate as directed by the user. Although this approach is more satisfactory than the first, it requires extensive cable connections to the switches, which are unsightly, subject to signal discontinuity, and somewhat complicated, for the user to set-up and control. Additionally, the complexity of this type of system increases with the addition of future components.

It is desirable to provide a component interconnection system which is relatively easy for the user to set-up and flexible enough to easily allow for future expansion by the user with a simple connection for subsequently added components. Such a system desirably has a minimum amount of signal conductors so as to facilitate relatively simple user set-up and control and to enhance system reliability. At the same time, cost should be minimized. Finally, a preferred system must have the ability to allow several audio and/or video components to operate simultaneously so that a user can maximize utilization of his system.

SUMMARY OF THE INVENTION

According to one aspect of the invention, a single signal conductor for either a video or audio signal is coupled between signal terminals of various components of an entertainment system in a serial manner for conducting the signal between the components. This arrangement resembles a daisy-chain arrangement in which the components are connected to the signal conductor in a distributed manner. A switch is located in series with the conductor for separating the conductor into first and second segments so as to allow simultaneous and independent signal distribution among groups of components connected to the first and second segments.

DESCRIPTION OF THE PREFERRED EMBODIMENTS

Figure 1:
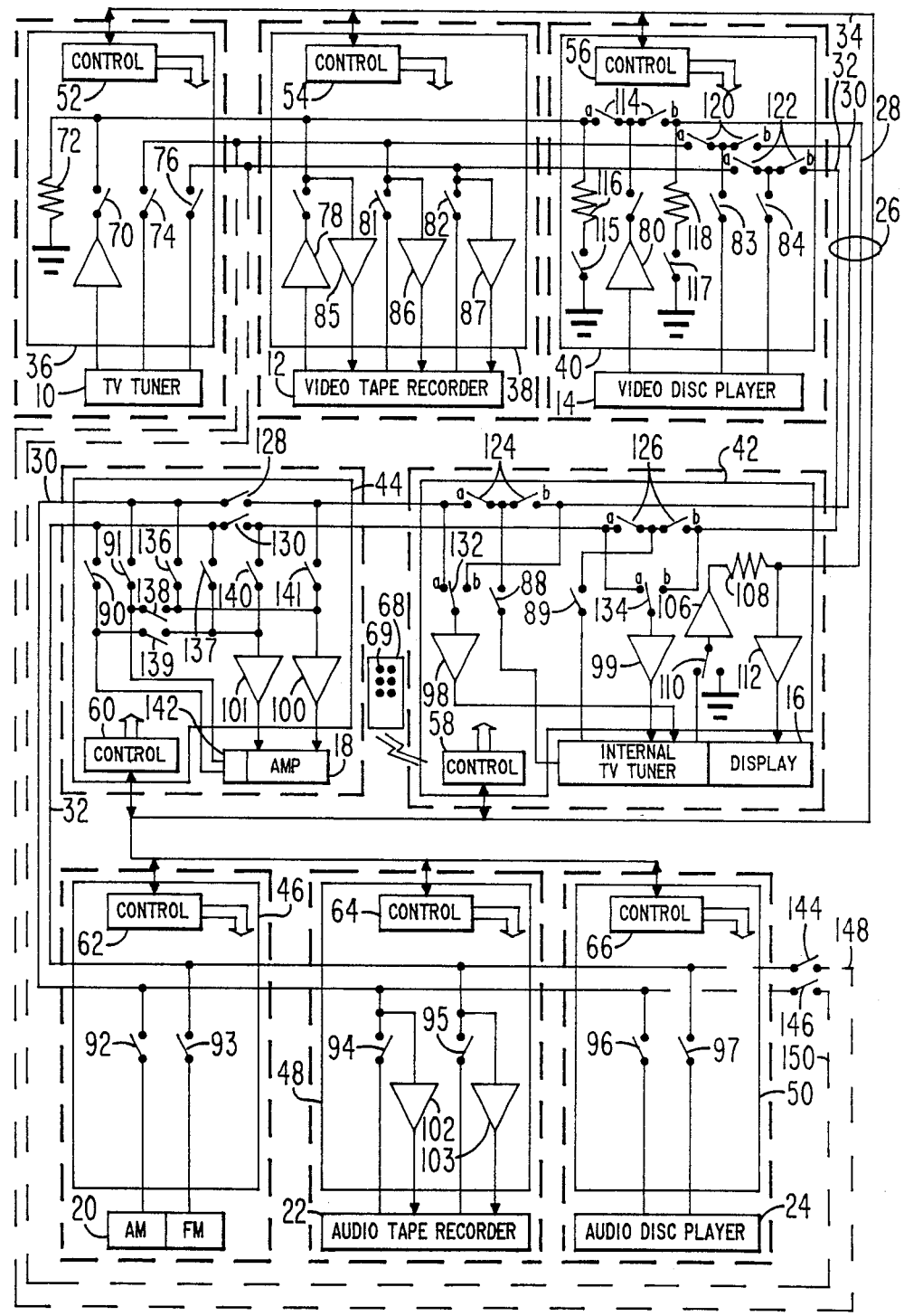
FIG. 1 illustrates partially in block diagram form and partially in schematic diagram form an audio and video components interconnection system constructed in accordance with the principles of the invention.

Referring to FIG. 1, a plurality of video and audio components are shown, each component having an associated connection stage for controlling the transmisson and/or reception of video and audio signals to or from other ones of the video and audio components. More specifically, a TV tuner 10, video tape recorder (VTR) 12, video disc player (VDP) 14 and a TV monitor 16, including a display and internal tuner, are shown as examples of typical home video components. An amplifier 18, AM/FM receiver 20, audio tape recorder (ATR) 22 and an audio disc player (ADP) 24 are shown as examples of typical home audio components. A single cable 26, including only three signal conductors or buses and a control conductor or bus, serves to couple the video and audio signals between each component so as to interconnect the component entertainment system. Cable 26 includes a shielded conductor signal bus 28 (of the coaxial cable type) having a 75 ohm characteristic impedance for distributing a baseband video signal, two shielded conductor signal buses 30 and 32 for distributing left and right stereophonic audio signals and a digital signal control bus 34 for distributing control signals among the various components of the system. Although stereophonic audio is not presently telecast, it is believed that it will soon become a reality. Thus, stereophonic audio is provided for in the present description.

Each of the video components 10–16 include a respective connection stage 36–42 for controlling the transmission and/or reception of video and audio between the components through the signal buses of cable 26. Each of the audio components 18–24 include a respective connection stage 44–50 for controlling the transmission and/or reception of audio signals between these components through audio signal buses 30 and 32. As indicated by the dashed lines enclosing each entertainment component and its associated connection stage, each component may have its connection stage incorporated within it.

Video components 10–16 are clustered together and cable 26 connects their respective connection stages together in a "daisy-chain" manner (i.e., cable 26 is connected from one connection stage to the next in a serial fashion). Similarly, audio buses 30 and 32 and control bus 34 interconnect a clustered arrangement of audio components 18–24.

Each of the connection stages includes a logic circuit 52–66, including, e.g., a microcomputer and a read-only-memory for storing a control program (not shown) which is responsive to the control signals transmitted on bus 34 for providing further control signals (as indicated by the broad arrows) for controlling the selective transmission and/or reception of video and/or audio signal between the associated audio or video component and cable 26. Additionally, via a remote control connection (not shown) between each connection stage and its associated component, the output signals control the functional operation of the component.

As will be described in greater detail later on, logic circuit 58 associated with the TV monitor 16 serves as a master logic unit for controlling the operation of the entire component entertainment system. The user may enter commands to the master from, for example, a remote control transmitter 68. Transmitter 68 includes a plurality of pushbuttons 69 for allowing the user to select any component of the entertainment system as a source of audio and/or video signals and any of the remaining components to receive those audio and/or video signals. In response to a received remote control message, the master logic circuit 58 supplies digital control signals to the remaining logic circuits associated with each of the other audio and/or video components through control bus 34 for completing the appropriate transmission and/or reception path.

The simplest type of connection stage is one which merely connects a signal source to a signal bus of interconnecting cable 26. TV tuner 10 is one such signal source and supplies a baseband video signal and stereophonic left and right audio signals to signal buses 28, 30 and 32, respectively. For that purpose, connection stage 36 includes a video driver amplifier 70 (described in detail later on with respect to FIG. 2) for supplying the video signal to bus 28. Driver 70 is responsive to an output signal of logic circuit 52 for providing a low output impedance when supplying a video signal to bus 28 or providing a high output impedance (as functionally represented by the opened switch connected in series with the output of driver 70) when not supplying a video signal to bus 28. The low output impedance (i.e., less than 10 ohms) is necessary in order to supply sufficient signal level to bus 28. The high impedance (i.e., greater than 1 k-ohm) is necessary at the output of driver 70 when it is not supplying a video signal to bus 28, in order to limit the coupling of video signal from bus 28 to ground via driver 70.

Since the frequency of baseband video signals is substantial, i.e., up to 4 MHz, proper terminations should be maintained at the ends of the video bus. The ends of video bus 28 should be terminated in its characteristic impedance in order to minimize video signal reflections wich would otherwise manifest themselves as ghosts in the reproduced video. Thus, the end of video bus 28 at connection stage 36 is terminated by a 75 ohm resistor 72 coupled between the center conductor of bus 28 and ground. The other end of video bus 28 is terminated by the video signal driver of connection stage 42, which is described in greater detail later on.

Connection stage 36 also includes selectively conductive switches 74 and 76 for supplying the left and right stereophonic audio signals from TV tuner 10 to audio buses 30 and 32, respectively, in response to control signals from logic circuit 52. Details of circuitry suitable as audio switches 74 and 76 is described in detail with respect to FIG. 3.

In a similar manner, video and audio signals from VTR 12 and VDP 14 are supplied to buses 28, 30 and 32 via video drivers 78 and 80 and audio switches 81–84 of connection stages 38 and 40, respectively.

Connection stage 38 also includes a high input impedance video signal buffer 85 and two high input impedance audio signal buffers 86 and 87 connected between signal buses 28, 30 and 32 for supplying video and audio signals from these buses to respective record input terminals (not shown) of VTR 12. Since these buffers present high impedance to the signal buses, the signal level on the bus will remain constant regardless of the operating mode of VTR 12.

Similarly, connection stages 42–50 include audio switches 88–97 for supplying left and right stereophonic audio signal to the audio signal buses 30 and 32 and connection stages 42, 44 and 48 include high impedance audio signal buffers 98–103 for supplying audio signal from buses 30 and 32 to the TV monitor 16, amplifier 18 and audio tape recorder 22. A description of the remainder of the audio switches shown in connection stages 42 and 44 will be described later on.

As previously noted, one end of video bus 28 is terminated in its characteristic impedance by a resistor 72 and the other end is terminated by a video signal driver in connection stage 42. At control stage 42, video signal from the internal tuner portion of monitor 16 is applied to bus 28 via a video signal driver 106 having a 75 ohm output impedance (represented by resistor 108). Driver 106 is described in greater detail with respect to FIG. 2. A switch 110 has a first position in which the video signal from the internal TV tuner is supplied to bus 28 via driver 106. If, however, video signal is to be recovered by monitor 16 from bus 28, switch 110 is caused (by control signals from logic circuit 58) to be in a second position which couples the input of driver 106 to signal ground. In this position, driver 106 maintains its 75 ohm output impedance and advantageously serves as the characteristic impedance termination for this end of video bus 28. A high input impedance video signal buffer 112 supplies video signal from bus 28 to the display portion of TV monitor 16 for reproducing the video signal from bus 28.

The interconnection system described thus far is relatively simple, requiring only one signal conductor for distributing video signal among the video components and two signal conductors for distributing stereophonic audio signal among the audio and video components. This provides for the previously noted desirable features of a minimum number of signal conductors, and results in a system that is simple to set-up and operate and is easily expandable. Although a single conductor is used for distributing each of the respective information signals, the system is not restricted to distributing only one signal at a time on each of the respective buses. That is, the desirable feature of allowing simultaneous and independent signal distribution among the components is provided for in this system. This is inexpensively accomplished, without the use of a matrix switching arrangement by breaking the continuity of the respective signal bus into at least two separate segments.

More specifically, connection stage 40 associated with VDP 14 includes two selectively conductive video signal paths which can separate the distribution of video signal originating at the TV tuner 10 or VTR 12 from the TV monitor 16. A switch 114 functionally represents these selectively conductive paths and includes two series connected single-pole, single-throw analog video signal switches 114a and 114b for allowing video signal from VDP 14 to be distributed to either of the separated portions of bus 28. Video signal switches are well known to those skilled in the art and can be constructed in a variety of well known ways.

In operation, the user can operate transmitter 68 to instruct the master controller 58 to have VTR 12 record video signal supplied from TV tuner 10 while, at the same time, video and audio signals from VDP 14 can be sent to the TV monitor 16 for simultaneous viewing.

However, as previously noted, proper termination of the ends of video bus should be maintained at all times to minimize signal reflections. When switch 114 is non-conductive it breaks the continuity of bus 28 into two separate segments, effectively forming two new ends. It is desirable to make provision for properly terminating these new ends of video bus 28 when switch 114 is non-conductive. To this end, switch 115 is provided for coupling bus 28 to ground via a 75 ohm resistor 116 when switch 114a is opened and switch 117 is provided for coupling bus 28 to ground via a 75 ohm resistor 118 when switch 114b is opened. For example, when switch 114a is opened and switch 114b is closed in order that TV tuner 10 can supply signals to VTR 12 while VDP 14 can supply signal to TV monitor 16, switch 115 will be closed and switch 117 will be opened.

The continuity of audio signal buses 30 and 32 may also be broken so as to allow simultaneous and independent audio signal distribution among the system components in a manner similar to the breaking of continuity of video bus 28. For this purpose, connection stage 40 includes series switch arrangements 120 and 122, connection stage 42 includes series switch arrangements 124 and 126, and connection stage 44 includes series switches 128 and 130 in buses 30 and 32, respectively, for separating these buses into smaller portions which allow independent and simultaneous audio signal distribution among components 10 and 12, 14 and 16, 16 and 18, and 20, 22 and 24 respectively. The construction of selectively conductive audio signal control paths suitable for forming series switches 120-130 are well known to those skilled in the audio signal handling art.

Connection stage 42 also includes single-pole, double-throw switches 132 and 134 for coupling audio signal from either of the portions of audio buses 30 and 32 separated by switches 124 and 126, to loudspeakers (not shown) included in TV monitor 16, via audio signal buffers 98 and 99, respectively.

Finally, connection stage 44 includes selectively conductive signal paths functionally respresented by single-pole, single-throw switches 136-141 in addition to previously mentioned switches 90 and 91, for controlling the coupling of audio signal between either of the portions of buses 30 and 32 separated by switches 128 and 130, and amplifier 18. Low level audio signal may be provided to audio buses 30 and 32 from a source selector switch 142 of amplifier 18 which receives audio signal from e.g., a further phonograph player (not shown).

In operation, in response to remote control messages received from transmitter 68, master controller 58 provides control signals to each of the slave logic units, which in turn control the operation of the previously noted switches and drivers and operating functions of their associated entertainment component, e.g., such as the power on/off status, volume level, channel selection, etc.

For example, remote control messages can be generated to record a TV program, display a stereo video disc with audio amplified by amplifier 18 and record a broadcast FM program, all at the same time. In this case, master controller 58 will instruct the slave logic units, via control bus 34, to supply control signals which cause the following functions to occur.

1. Turn on the appropriate components, i.e., tuner 10, VTR 12, VDP 14, amplifier 18, AM/FM receiver 20 and ATR 22.

2. Break the continuity of the audio and video buses as follows:
   a. Open switches 114a, 120a and 122a and close switches 114b, 120b and 122b.
   b. Open switches 124a and 126a and close switches 124b and 126b.
   c. Open switches 128 and 130.

3. Provide proper termination of the video bus as follows:
   a. Close switch 115, open switch 117 and operate switch 110 so that the input of driver 106 is coupled to ground in order that output impedance 108 of driver 106 serves as a characteristic impedance termination for bus 28.

4. Select the appropriate operating condition of each component as follows:
   a. Set TV tuner 10 to the desired TV channel.
   b. Set VTR 12 to the record mode.
   c. Set VDP 14 to the play mode.
   d. Set the desired volume level of amplifier 18.
   e. Set AM/FM receiver 20 to the desired FM station.
   f. Set ATR 22 to the record mode.

5. Select appropriate signal routing as follows:
   a. Enable video driver 70 to supply video signal to bus 28 and close switches 74 and 76 in order that the video and audio signals from TV tuner 10 can be coupled to the record inputs of VTR 12 via buffers 85, 86 and 87 of connection stage 38.
   b. Enable video driver 80 and switches 83 and 84 of connection stage 36 to supply the video and audio signals from the video disc player 14 to interconnecting cable 26 via closed switches 114b, 120b and 122b. The video signal will be coupled to the display of TV monitor 26 via buffer 112 and the audio signals will be coupled to the amplifier 18 via closed switches 124a and b, 126a and b, 140, 141 and buffers 100 and 101.
   c. Close switches 92 and 93 of connection stage 46 in order to supply the received broadcast FM audio signals to the record inputs of ATR 22 via audio buses 30 and 32 and buffers 102 and 103 of connection stage 48.

Figure 2:
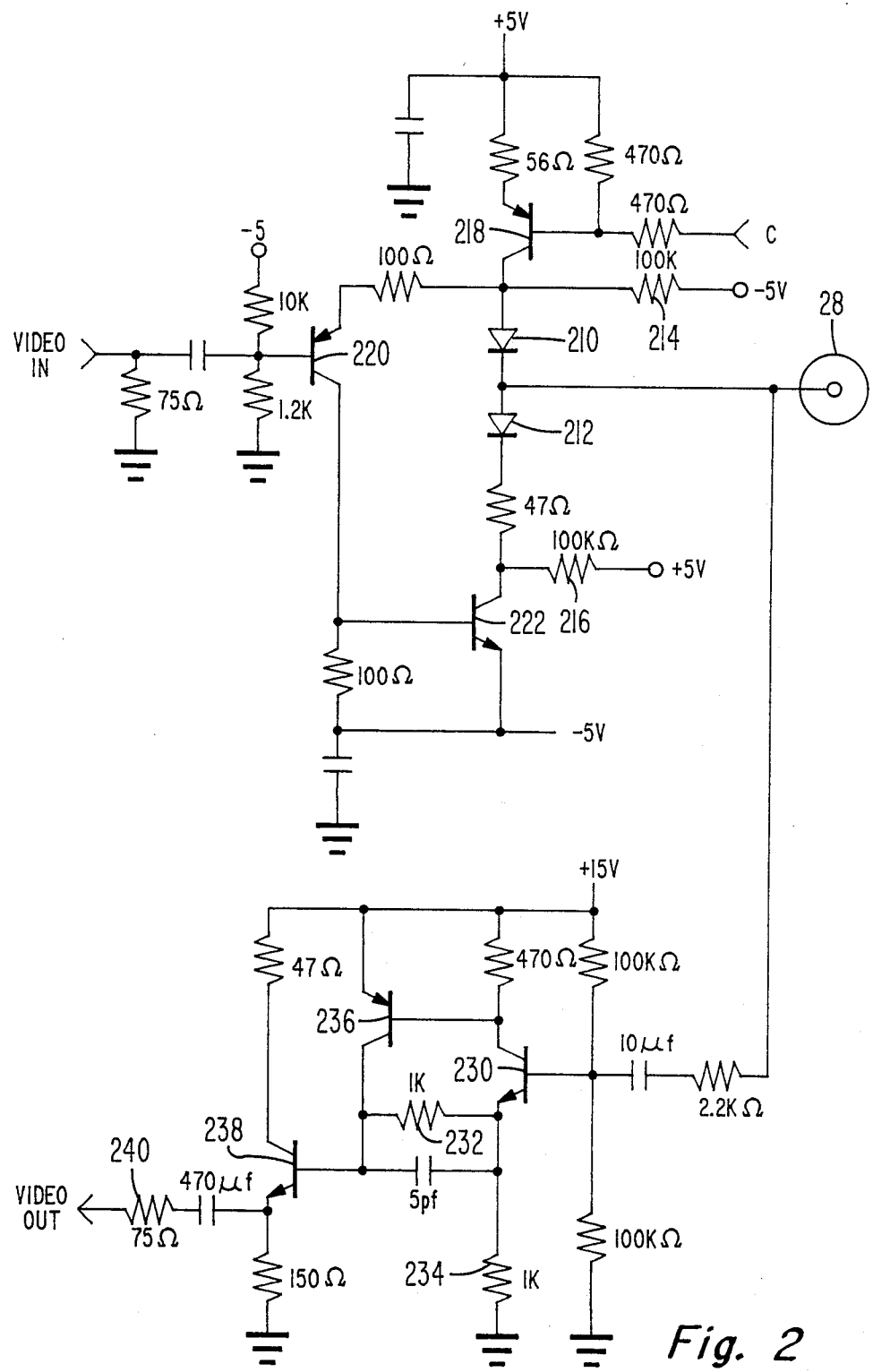
FIGS. 2 and 3 illustrate in schematic diagram form details of portions of FIG. 1.

The upper portion of FIG. 2 shows an example of circuitry suitable for constructing video drivers 70, 78 or 80. As previously noted, the video driver must be able to be controlled to selectively provide either a low or a high output impedance.

Each driver includes two series connected pin diodes 210 and 212, the junction therebetween connected to video bus 28. The diodes are initially reversed biased by the application of −5 volts to the anode of diode 210 via resistor 214 and +5 volts to the cathode of diode 212 via a resistor 216. A control transistor 218 receives a signal C at its base which, when at a low logic level, causes transistor 218 to conduct and increase the potential at the anode of pin diode 210. This causes diode 210 to become forward biased and provides current to the emitter of transistor 220, allowing it to conduct the video signal applied at its base to the base of transistor 222. This causes transistor 222 to become conductive and forward biases diode 212, completing the low impedance path for supplying video signal to bus 28. Due to the negative feedback provided by the conduction of transistor 220 and diode 212, the output impedance of the video driver is held low (i.e., less than 10 ohms) and its bandwidth is sufficiently wide for passing the baseband video signal (up to 4 MHz).

When the signal C is at a high logic level, transistor 218 is not conductive and the conduction of transistors 220 and 222 is prevented. Thus, pin diodes 210 and 212 remain reverse biased and present a high impedance to video bus 28. Pin diodes are used for establishing the high/low impedance link to bus 28 because of the relatively high impedance they present during their reverse bias condition at video signal frequencies.

The lower portion of FIG. 2 illustrates circuitry suitable for constructing video buffers 85 and 112 and, video driver 106. The video signal from bus 28 is applied by emitter follower transistor 230 to the junction of equal valued resistors 232 and 234. An opposite conductivity type transistor 236 clamps the voltage at the collector of transistor 230 to approximately 1 $V_{be}$ below 15 volts for stabilizing its operation with respect to temperature variations. The signal level at the junction of resistors 232 and 234 is substantially equal to the signal level at the base of transistor 230 due to its emitter follower operation. Since resistors 232 and 234 are of equal value, the signal level at the junction of resistor 232 and the base of a transistor 238 is twice the input video signal level. Emitter follower transistor 238 provides the output signal. A 75 ohm resistor 240 provides impedance matching to the video signal input terminal of the associated video component. Since the amplifier arrangement has a gain of 2, the 50% signal reduction due to the 75 ohm output impedance is compensated for.

When the circuitry of the lower portion of FIG. 2 is used as video driver 106, the base of transistor 230 is connected to switch 110 of FIG. 1 and the 75 ohm resistor 240 corresponds to resistor 108 of FIG. 1.

Figure 3:
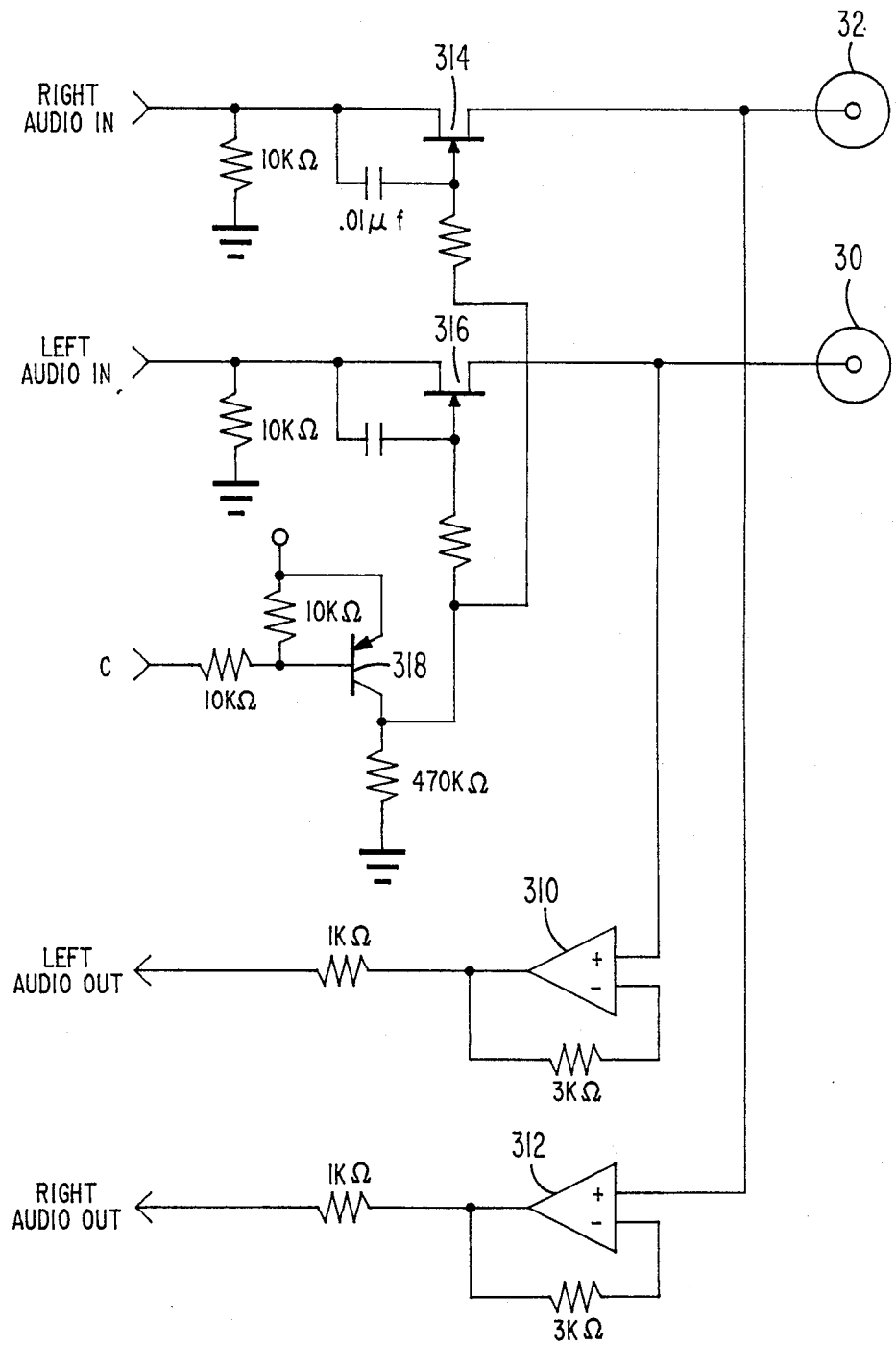

The lower portion of FIG. 3 illustrates circuitry suitable for constructing the audio buffers of the system and the upper portion of FIG. 3 illustrates circuitry suitable for constructing the various audio switches. The left and right audio buffers comprise respective high input impedance FET operational amplifiers 310 and 312, biased for operation as unity-gain followers for applying the audio signal from buses 30 and 32 to the audio input terminals of the associated audio components. The audio switches comprise respective FET transmission gates, such as 314 and 316 for providing signal paths between the audio output terminals of the associated audio component and the buses 30 and 32. Each transmission gate is enabled to conduct by the conduction of a control transistor 318 in response to the application of a control signal C to its base electrode from the logic unit of the associated connection stage.

Thus, what has been described is an interconnection arrangement for a component entertainment system which has a single signal conductor bus for each information signal, which connects the individual components in "daisy-chain" fashion which allows the information signal to be selectively supplied and/or received from the signal buses in a distributed manner. This arrangement facilitates user set-up, enhances system reliability and provides for expansion for subsequent components in a simple manner. The video and audio components of the system are clustered together on separate sections of the signal buses and series switching elements allow for simultaniety of operation of the separate clusters.

Figure 4:
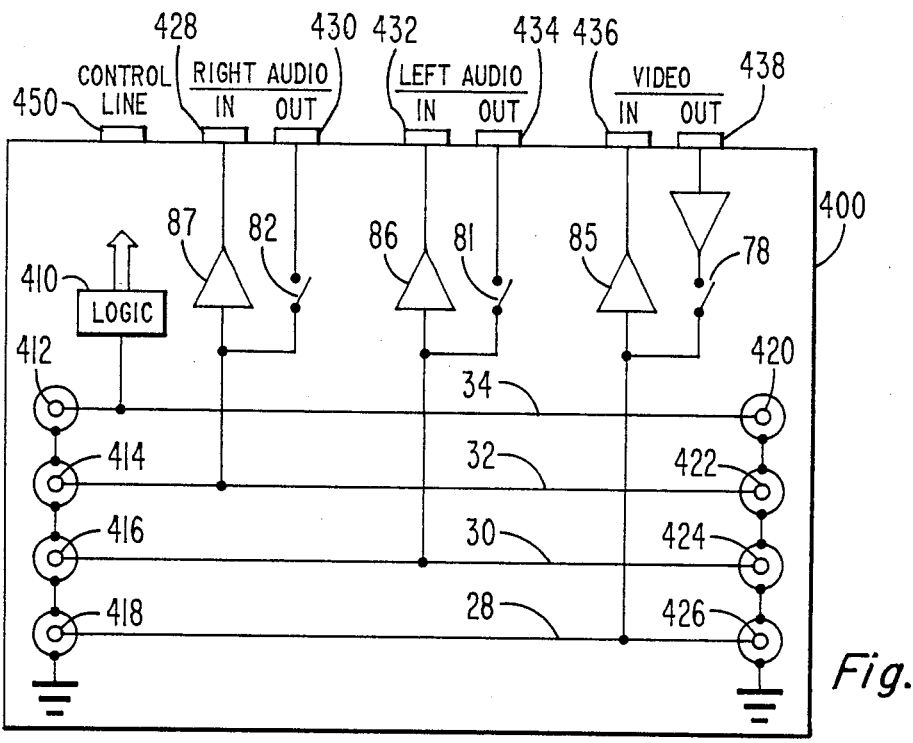
FIGS. 4 and 5 illustrate in block diagram form a modularized embodiment of the audio and video component interconnection system constructed in accordance with the principles of the invention.
Figure 5:
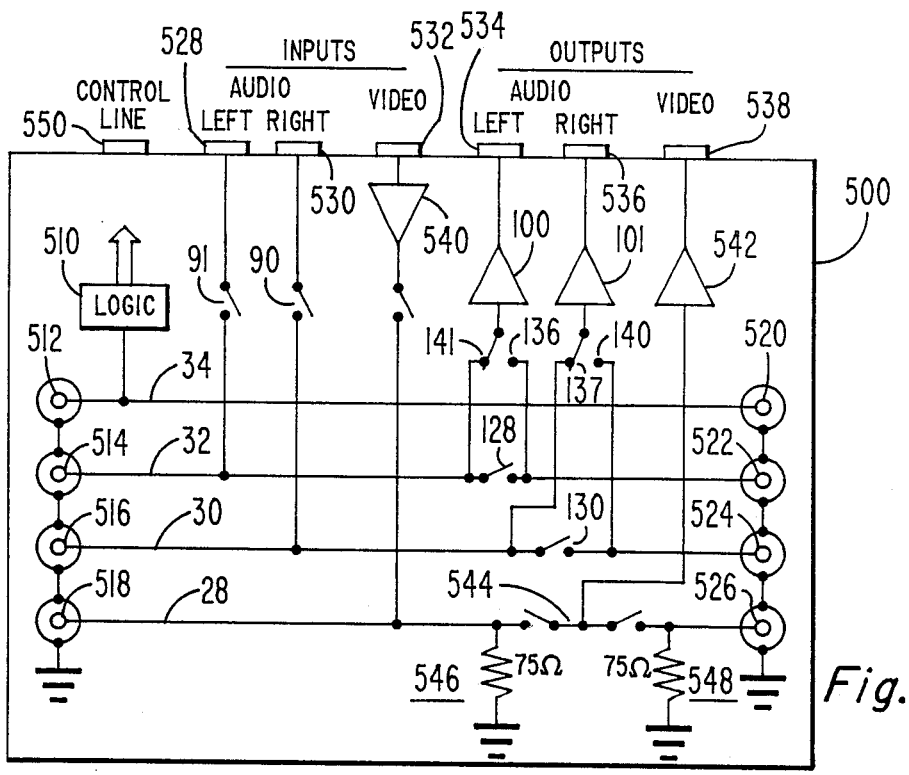

Connections for a modular embodiment of the type of connection stages used in the interconnection system shown in FIG. 1, are shown in FIGS. 4 and 5. FIG. 4 shows a generalized interconnection module 400 which does not include provision for breaking the continuity of the signal buses and FIG. 5 shows a generalized interconnection module 500 which has such provisions.

For interconnecting the modules with cable 26 to form the "daisy-chain", each module includes bus input and output coaxial terminals 412–426 and 512–526. For connection between each module and its associated component, component input and output terminals 428–432 and 528–532 are provided.

Each of modules 400 and 500 include buffers, drivers and switches which are constructed and operate in the same manner as correspondingly identified elements previously described with respect to FIG. 1. For example, connection stage 38 associated with the VTR 12 could be provided by module 400 including elements identified by the same reference numbers as connection stage 38 of FIG. 1. If, however, module 400 was to be used for providing a connection stage for an audio only component, such as connection stage 48 associated with the audio tape recorder 22, only the audio switches and buffers would be used (i.e., video related elements 78, 85, 28, 418 and 426 would be omitted).

Module 500 could be used for providing connection stage 40 which is associated with the VDP 14 of FIG. 1 and includes provisions for breaking the continuity of signal buses 28, 30 and 32. The video portion of module 500 includes a video driver 540 and video buffer 542 similar to those of FIG. 2 and a selectively conductive video signal path, functionally represented by series switch 544, for breaking the continuity of video bus 28 and for applying video signals to buffer 542 from either of the separated portions of the bus, such as described with respect to connection stage 40. Resistor switch arrangements 546–548 provide proper characteristic impedance terminations for the separated portions of bus 28 when switch 544 is non-conductive, in a manner similar to that described with respect to connection stage 40. The audio portion of module 500 is substantially similar to connection stage 44 of FIG. 1, as indicated by the use of the same reference numbers in these FIGURES.

Modules 400 and 500 include logic circuits 410 and 510, respectively, which correspond in function to the slave logic units shown in FIG. 1. As previously noted, control signal generated by the slave logic units are also coupled to a remote control input of the associated component via a remote control operation line, for remotely controlling the operating functions of the associated component. Modules 400 and 500 include terminals 450 and 550 for providing connection of the remote control lines between the module and the remote control input of its associated component.

Although a particular arrangement of switches has been shown, other arrangements are possible within the scope of the present invention. For example, although two series connected switches 114a and 114b are shown in FIG. 1, for breaking the continuity of video bus 28, it is to be understood that a single series switch such as 114a could be used for breaking the continuity of video bus 28.

Additionally, further signal switches could be added to the interconnection system for allowing even greater simultaneity of operation. For example, with reference to FIG. 1, again two series audio switches 142 and 144 can be used to couple together the ends of audio buses 30 and 32 at connection stage 36 to the ends at connection stage 50, so as to form a circular bus configuration, as indicated by dashed lines 146 and 148 in FIG. 1.

These and other modifications are considered to be within the scope of the following claims.

What is claimed is:

1. Interconnection apparatus for transferring audio and video signals between a plurality of separate audio and audio/video components of a home entertainment system, said audio components including audio signal inputs and/or outputs and said audio/video components including audio and video signal inputs and/or outputs, comprising:

an audio signal transmisson path for transferring an audio signal among said audio and audio/video components;

a video signal transmission path for transferring a video signal among said audio/video components;

a plurality of connection means, each of said connection means being associated with a respective one of said audio and audio/video components for connecting said audio signal inputs and/or outputs of said audio components to said audio signal transmission path at distributed locations adjacent one another along said audio transmission path and connecting said audio and video signal inputs and/or outputs of said audio/video components to said audio and video signal transmission paths, respectively, at distributed locations adjacent one another along said audio and video signal transmission paths, respectively; and audio switch means connected in series with said audio signal transmission path for selectively separating said transmission path into first and second audio path segments wherein all of said audio components are associated by their respective connection means with said first audio path segment and all of said audio/video components are associated by their respective connection means with said second audio path segment so as to allow simultaneous and independent audio signal transfer among said audio components connected to said first audio path segment and said audio/video components connected to said second audio path segment.

2. The apparatus as recited in claim 1 wherein:
one of said audio components associated by its respective connection means to said first segment and which is located nearest to said audio switch means, comprises an audio signal amplifier.

3. The apparatus recited in claim 2, wherein:
one of said audio/video components associated by its respective connection means to said second segment and which is located nearest to said audio switch means, comprises a television monitor, including an internal audio signal amplifier and loudspeakers.

4. The apparatus recited in claim 1, further including:
video switch means located in series with said video signal transmission path for selectively separating said video signal transmission path into first and second video path segments so as to simultaneously allow video signal transfer among those of said audio/video components which are associated by their respective connection means to said first video path segment, independently of video signal transfer among those of said audio/video components which are associated by their respective connection means to said second video path segment.

5. The apparatus recited in claim 4, wherein:
said video switch means is located in a selected one of said connection means.

6. The apparatus recited in claim 5, further including:
an additional audio switch means located in series with said second audio path segment for selectively separating said second audio path segment into third and fourth audio path segments having audio/video components respectively associated therewith which correspond with those of said audio/video components associated with said first and second video path segments, respectively.

7. The apparatus recited in claim 5, wherein:
said additional audio switch means and said video switch means are located in the same one of said connection means.

8. The apparatus recited in claim 1, further including:
a control signal transmission path adapted for transferring control signals among said plurality of said connection means associated with respective ones of said audio and audio/video components, for controlling the coupling of the audio and video signals by said connection means between respective ones of said audio and video signal inputs and/or outputs of said audio and audio/video components and said audio and video signal transmission paths.

9. The apparatus recited in claim 8, wherein:
said video signal transmission path comprises a plurality of coaxial transmission lines, serially connected by respective ones of said plurality of said connection means in a daisy-chain fashion among said plurality of separate audio/video components.

10. The apparatus recited in claim 9, wherein:
said audio signal transmission path comprises at least first and second signal conductors for transferring left and right stereo audio signals, respectively, among said plurality of separate audio and audio/video components.

* * * * *